(12) United States Patent
Yao et al.

(10) Patent No.: US 12,425,342 B2
(45) Date of Patent: Sep. 23, 2025

(54) LAYER 4 LOAD AWARE LOAD BALANCING

(71) Applicant: Cisco Technology, Inc., San Jose, CA (US)

(72) Inventors: Zhiyuan Yao, Paris (FR); Yoann Louis Simon Desmouceaux, Paris (FR); Pierre Pfister, Roquefort-les-Pins (FR); William Mark Townsley, San Francisco, CA (US)

(73) Assignee: Cisco Technology, Inc.

( * ) Notice: Subject to any disclaimer, the term of this patent is extended or adjusted under 35 U.S.C. 154(b) by 444 days.

(21) Appl. No.: 17/747,421

(22) Filed: May 18, 2022

(65) Prior Publication Data
US 2023/0403235 A1    Dec. 14, 2023

(51) Int. Cl.
*H04L 47/125* (2022.01)
*H04L 43/067* (2022.01)
*H04L 43/0852* (2022.01)
*H04L 43/20* (2022.01)
*H04L 47/2441* (2022.01)
*H04L 47/52* (2022.01)
*H04L 67/1008* (2022.01)

(52) U.S. Cl.
CPC .......... *H04L 47/125* (2013.01); *H04L 43/067* (2013.01); *H04L 43/0852* (2013.01); *H04L 47/2441* (2013.01); *H04L 47/522* (2013.01); *H04L 67/1008* (2013.01); *H04L 43/20* (2022.05)

(58) Field of Classification Search
CPC ... H04L 43/20; H04L 43/067; H04L 43/0852; H04L 47/2441; H04L 47/522; H04L 47/125; H04L 67/1008
See application file for complete search history.

(56) References Cited

U.S. PATENT DOCUMENTS 6,711,137 B1 * 3/2004 Klassen ............. H04L 41/142
370/252
6,748,413 B1 * 6/2004 Bournas ............. G06F 9/505
709/200

(Continued)

FOREIGN PATENT DOCUMENTS

WO   WO-2009083829 A2 * 7/2009 .......... G06F 11/2035
WO   WO-2022263869 A1 * 12/2022 .......... G06F 16/953

OTHER PUBLICATIONS

Ahmed H, Arshad MJ, Muhammad S, Ahmad S, Zahid AH. Queue length-based load balancing in data center networks. Int J Commun Syst. 2020 (Year: 2020).*

(Continued)

*Primary Examiner* — Emmanuel L Moise
*Assistant Examiner* — Robert A Shaw
(74) *Attorney, Agent, or Firm* — Merchant & Gould P.C.

(57) ABSTRACT

Load aware load balancing may be provided. Flow duration data associated with a plurality of flows associated with a plurality of servers may be obtained. Then a plurality of queue lengths respectively associated with the plurality of servers may be obtained. Next, a Shortest Expected Delay (SED) score may be determined for each of the plurality of servers based on the flow duration data and the plurality of queue lengths. A flow may then be assigned to a one of the plurality of servers having the lowest SED score.

20 Claims, 5 Drawing Sheets

(56) References Cited

U.S. PATENT DOCUMENTS

| | | | | |
|---|---|---|---|---|
| 6,748,414 | B1* | 6/2004 | Bournas | G06F 9/505 709/224 |
| 7,010,602 | B2* | 3/2006 | Poindexter | G06Q 10/10 709/202 |
| 7,231,445 | B1* | 6/2007 | Aweya | H04L 67/1001 709/227 |
| 7,551,623 | B1* | 6/2009 | Feroz | H04L 47/562 709/224 |
| 7,756,690 | B1* | 7/2010 | Mogul | G06Q 10/06 717/124 |
| 8,245,238 | B2* | 8/2012 | Neubauer | G06F 9/5083 709/201 |
| 9,258,272 | B1 | 2/2016 | Durand et al. | |
| 10,277,518 | B1* | 4/2019 | Matthews | H04L 47/129 |
| 10,708,152 | B2* | 7/2020 | Kulshreshtha | H04L 41/145 |
| 11,128,561 | B1* | 9/2021 | Matthews | H04L 43/0882 |
| 2002/0042823 | A1* | 4/2002 | DeBettencourt | G06F 11/3433 709/224 |
| 2003/0161321 | A1* | 8/2003 | Karam | H04L 45/12 370/395.21 |
| 2003/0179717 | A1* | 9/2003 | Hobbs | H04L 9/40 370/254 |
| 2003/0198204 | A1* | 10/2003 | Taneja | H04L 47/15 370/332 |
| 2003/0223366 | A1* | 12/2003 | Jeffries | H04L 47/29 370/231 |
| 2004/0250059 | A1* | 12/2004 | Ramelson | H04L 63/0428 713/150 |
| 2006/0182034 | A1* | 8/2006 | Klinker | H04L 45/123 370/248 |
| 2007/0143460 | A1* | 6/2007 | Ben-David | H04L 67/1001 709/223 |
| 2007/0268860 | A1* | 11/2007 | Taneja | H04L 5/0044 455/452.2 |
| 2008/0085717 | A1* | 4/2008 | Chhabra | G06F 9/5011 455/450 |
| 2009/0161548 | A1* | 6/2009 | Zhu | H04L 41/0681 370/237 |
| 2009/0254660 | A1* | 10/2009 | Hanson | H04L 12/10 709/226 |
| 2011/0044174 | A1* | 2/2011 | Szymanski | H04L 47/6295 370/238 |
| 2014/0169164 | A1* | 6/2014 | Oguchi | H04L 47/193 370/230 |
| 2015/0074679 | A1* | 3/2015 | Fenoglio | H04L 67/1008 718/104 |
| 2016/0072766 | A1 | 3/2016 | Jain et al. | |
| 2016/0373406 | A1 | 12/2016 | Kivinen et al. | |
| 2017/0295247 | A1* | 10/2017 | Llorca | H04L 41/5041 |
| 2018/0316625 | A1* | 11/2018 | Xu | H04L 43/0852 |
| 2019/0129771 | A1* | 5/2019 | Chen | G06F 12/0875 |
| 2020/0028795 | A1* | 1/2020 | Tiwary | H04L 47/6275 |
| 2021/0014891 | A1* | 1/2021 | Talarico | H04W 72/1273 |
| 2022/0014478 | A1* | 1/2022 | Lee | H04L 47/781 |
| 2022/0229451 | A1* | 7/2022 | Shindin | G05D 7/0623 |
| 2023/0216564 | A1* | 7/2023 | Chen | H04B 7/088 375/262 |

OTHER PUBLICATIONS

T. Hellemans and B. Van Houdt, "Improved Load Balancing in Large Scale Systems Using Attained Service Time Reporting," in IEEE/ACM Transactions on Networking, vol. 30, No. 1, pp. 341-353, Feb. 2022 (Year: 2022).*

N. Cardwell, S. Savage, and T. Anderson, Modeling TCP Latency, IEEE Infocom 2000, Apr. 2000 (Year: 2000).*

Liu et al A port-based forwarding load-balancing scheduling approach for cloud datacenter networks, Journal of Cloud Computing: Advances, Systems and Applications, Oct. 13, 2021 (Year: 2021).*

Wikipedia: Softtmax function, retrieved Jun. 14, 2024 https://en.wikipedia.org/wiki/Softmax_function (Year: 2024).*

Dec, W., R. Asati, C. Congxiao, H. Deng, M. Boucadair, "Stateless 4VIA6 Address Sharing Draft-Dec-Stateless-4V5-04" Network Working Group, Apr. 16, 2012.

* cited by examiner

LAYER 4 LOAD AWARE LOAD BALANCING

TECHNICAL FIELD

The present disclosure relates generally to providing layer 4 load aware load balancing.

BACKGROUND

A data center is a facility comprising networked computers, storage systems, and computing infrastructure that enterprises use to assemble, process, store and disseminate large amounts of data. A business typically relies on the applications, services, and data contained within a data center, making it an asset for everyday operations.

Enterprise data centers increasingly incorporate facilities for securing and protecting cloud computing resources and in-house, on-site resources. As enterprises turn to cloud computing, the boundaries between cloud providers' data centers and enterprise data centers become less clear-cut.

A data center facility that enables an enterprise to collect its resources and infrastructure for data processing, storage, and communications, may include the following: i) systems for storing, sharing, accessing, and processing data across the enterprise; ii) physical infrastructure for supporting data processing and data communications; and iii) utilities such as cooling, electricity, network security access, and Uninterruptible Power Supplies (UPSs).

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
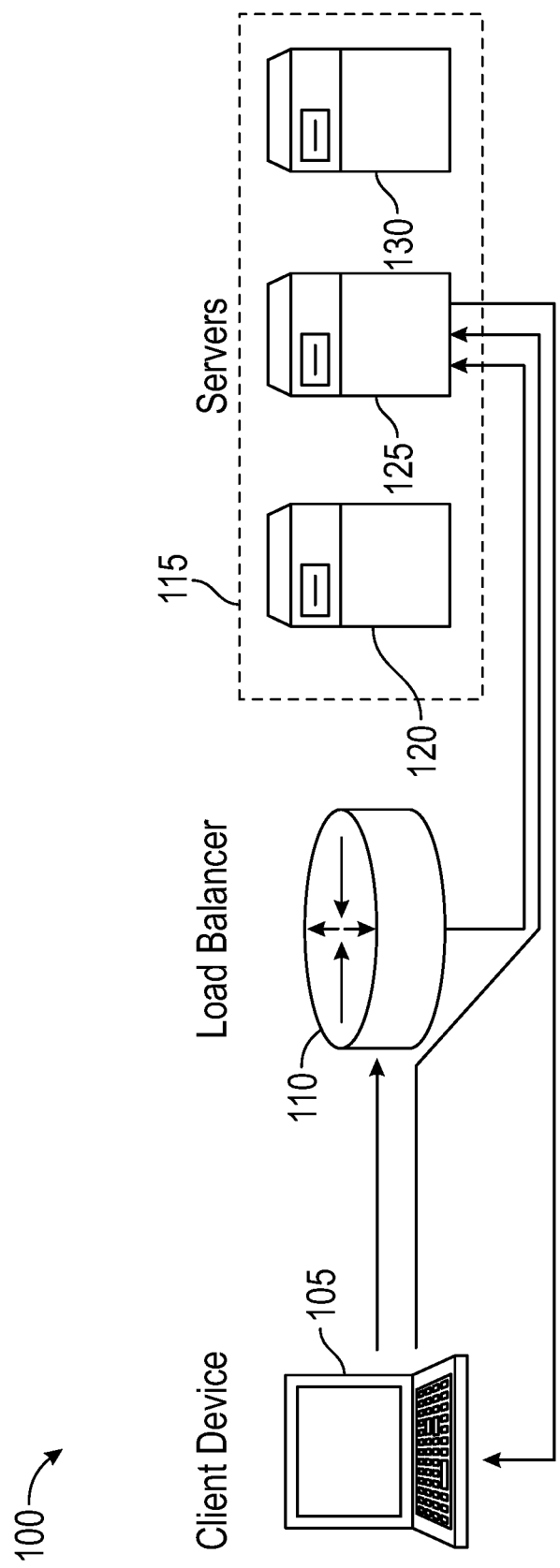
FIG. 1 is a block diagram of an operating environment for providing load aware load balancing.

Load aware load balancing may be provided. Flow duration data associated with a plurality of flows associated with a plurality of servers may be obtained. Then a plurality of queue lengths respectively associated with the plurality of servers may be obtained. Next, a Shortest Expected Delay (SED) score may be determined for each of the plurality of servers based on the flow duration data and the plurality of queue lengths. A flow may then be assigned to a one of the plurality of servers having the lowest SED score.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Network load balancers (e.g., layer 4 load balancers) may play an important role in data centers and may help achieve better QoS with less provisioned resources if a workload is fairly distributed (i.e., overloaded or underutilized servers being avoided). Unlike layer 7 load balancers, layer 4 load balancers may be agnostic to specific types of applications or application-layer protocols and may not have observations on instantaneous load states on server clusters. Without such observations, the load balancing decisions may be suboptimal.

A load balancing strategy of layer 4 load balancers may comprise using an Equal-Cost Multi-Path (ECMP) process that may forward a new-coming flow to a Destination Internet Protocol (DIP) indexed by its 5-tuple hash in a bucket table entry. This approach may distribute workload homogeneously across all servers, and it may risk overloading servers with less provisioned computational resources, leading to suboptimal resource utilization. Embodiments of the disclosure, however, may adapt machine learning techniques (e.g., Kalman filters) that use network features that may be passively observed from a data plane to infer instant server load states and make load-aware load balancing decisions to optimize workload distribution.

In modern data centers where virtualized network functions and services may run on heterogeneous architectures with different processing capacities, uniformly distributing workload (network flows) across application servers may lead to suboptimal resource allocation, leading to resource overload or starvation. To optimize resource allocations in elastic data centers, where virtualized application instances may have different capacities, to fairly distribute workload across application servers, weights may need to be manually configured on load balancers, increasing management overhead. Co-located workload may be assigned to computational resources that may be shared by different applications, making some servers have lower processing speeds than the others, leading to degraded QoS. In a short period of time, bursts of requests from the same group of clients using simple heuristics (e.g., ECMP, Weighted-Cost Multi-Path (WCMP)) may overload a subset of application servers because the load balancers may not be aware of the instantaneous load states of the servers.

To address the aforementioned problems, embodiments of the disclosure may passively learn server processing capacities from networking features extracted from network flows/packets without the need to manually configuring weights for application servers. Embodiments of the disclosure may automatically detect malfunctioning application servers and stop forwarding more traffic to the server. Furthermore, embodiments of the disclosure may be responsive to the bursts of requests by tracking instant on-going jobs on each application servers and may require no modification on or communication with the application servers.

A load balancing process, consistent with embodiments of the disclosure, may dynamically distributes workloads across servers relying on the estimations of both: i) instant server loads; and ii) server residual processing speeds. Upon reception of a packet, the load balancer may inspect packet headers, tracks connection states, and passively gather observations, comprising the number of on-going connections on each server and average flow durations on each server. Next the load balancer may gather flow durations with reservoir sampling and may learn the processing speed of each server using Kalman filters for example. Then the load balancer may integrate both processing speeds and dynamic load states information using a Shortest Expected Delay (SED) scheduling algorithm to generate scores for all servers based on which load balancing decisions are made.

FIG. 1 shows an operating environment 100 for providing load aware load balancing. As shown in FIG. 1, operating environment 100 may comprise a client device 105, a load balancer 110, and a plurality of servers 115. Plurality of servers 115 may comprise a first server 120, a second server 125, and a third server 130.

Client device 105 may comprise, but is not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device.

Load balancer 110 may be disposed in a data center where plurality of servers 115 may provide, for example, cloud services and network applications to client device 105 with high scalability, availability, and Quality-of-Service (QoS). Load balancer 110 may distribute network traffic addressed to a given cloud service evenly on plurality of servers 115, while consistently maintaining established connections.

FIG. 1 illustrates the workflow of load balancer 110. On receipt of a new connection request, load balancer 110 may determine to which server in plurality of servers 115 the new connection may be dispatched. In the example shown in FIG. 1, load balancer 110 may dispatch the new connection to second server 125. Second server 125 may respond to the request using Direct Source Return (DSR) mode to client device 105 and load balancer 110 may have no access to the server-to-client side of the communication. The load balancing decision made upon the new connection may be preserved until the connection terminates.

The elements described above of operating environment 100 (e.g., client device 105, load balancer 110, first server 120, second server 125, and third server 130) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
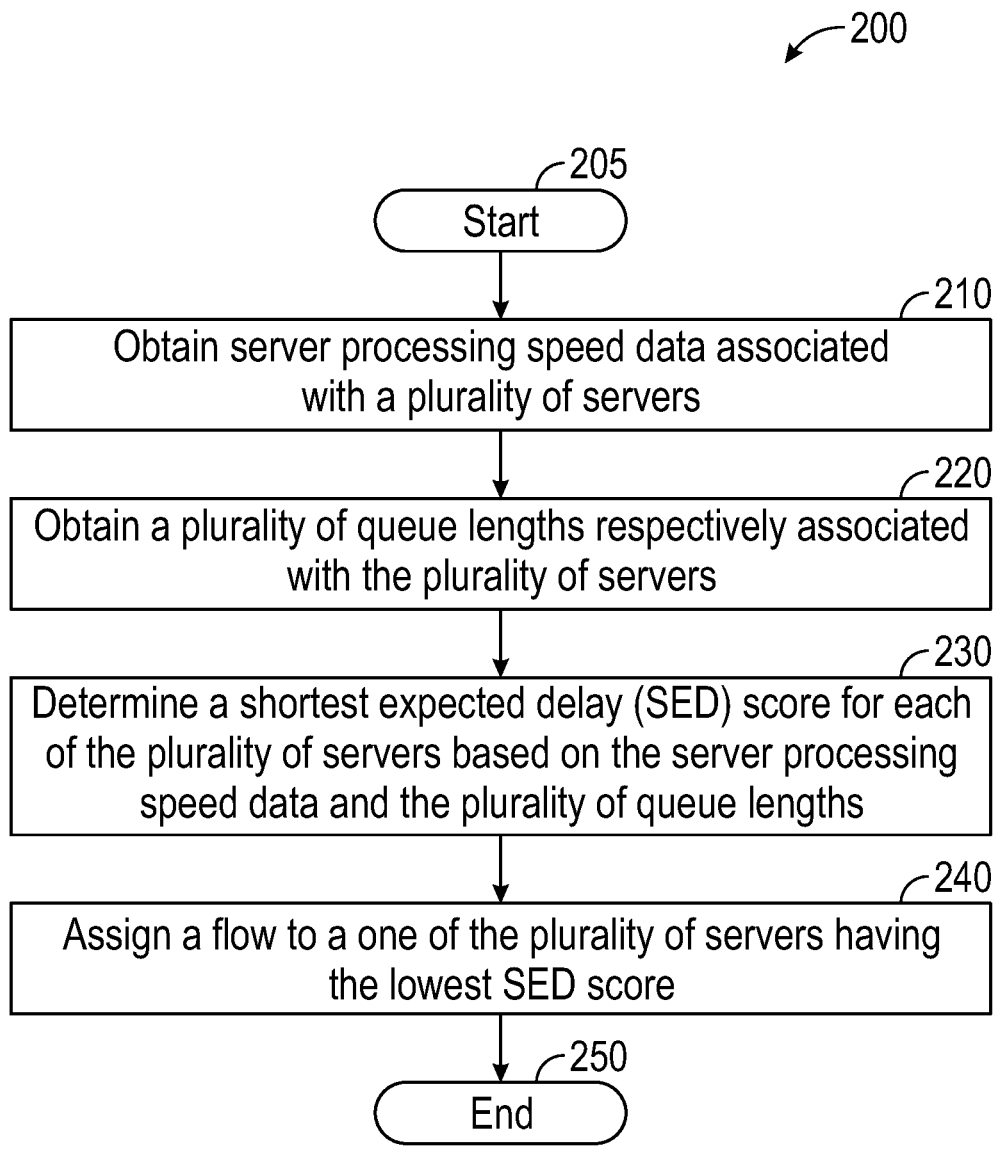
FIG. 2 is a flow chart of a method for providing load aware load balancing.

FIG. 2 is a flow chart setting forth the general stages involved in a method 200 consistent with an embodiment of the disclosure for providing load aware load balancing. Method 200 may be implemented using load balancer 110 as described in more detail above with respect to FIG. 1. Ways to implement the stages of method 200 will be described in greater detail below.

Method 200 may begin at starting block 205 and proceed to stage 210 where load balancer 110 may obtain server processing speed data associated with plurality of servers 115. For example, to estimate instant server loads, embodiments of the disclosure may statefully track each connection using a flow table shown in FIG. 3A, comprising the following columns:
  Hash: e.g., digest of Transmission Control Protocol (TCP) 5-tuple;
  DIP: the ID of a target server i decided by the load balancing process of FIG. 4 below;
  Timeout: packet validity, renewed upon new packet receptions;
  T0: a timestamp of the first data packet reception in a registered flow, used for processing speed estimation; and
  State: state of the connection comprising {NULL, SYN, CONN}.

Figure 3B:
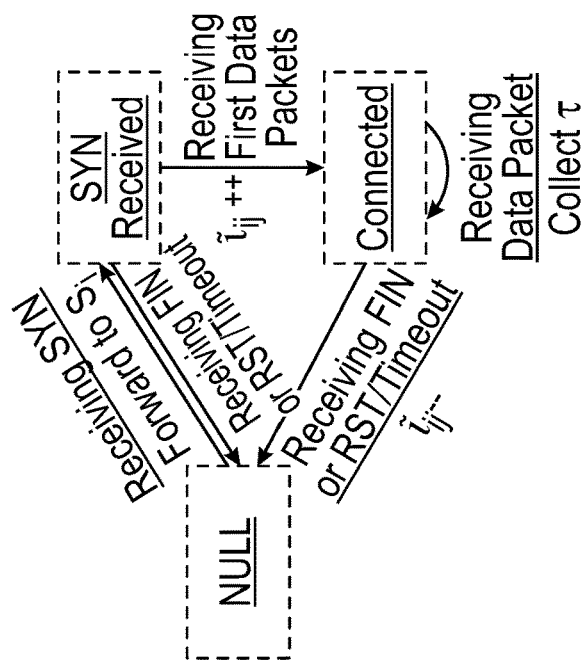
FIG. 3A and 3B illustrate a flow table and state transition for estimation of instant server loads.
Figure 3A:
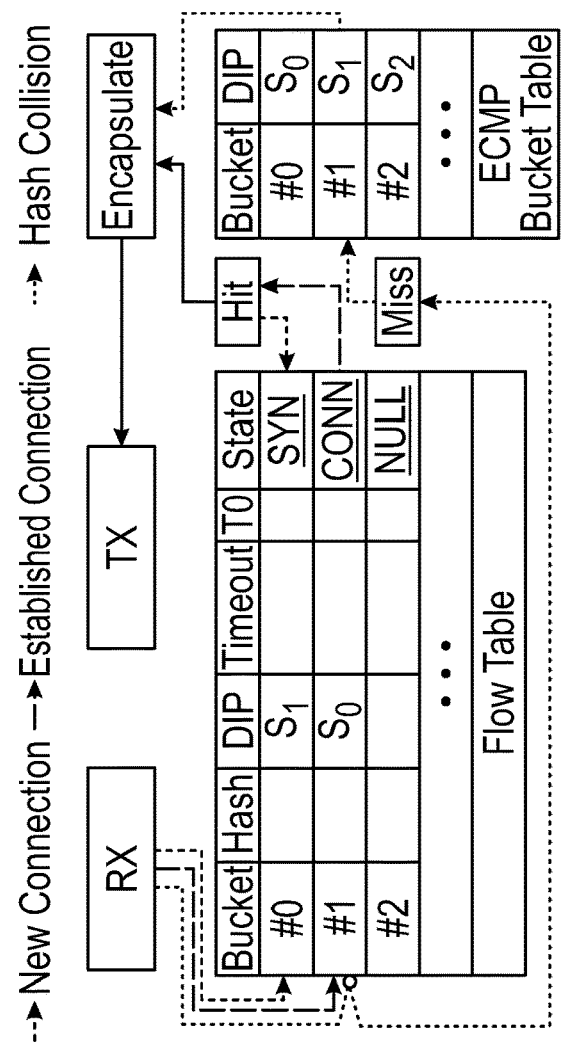

A new connection may be registered in the flow table of FIG. 3A if the mapped bucket is available, and its subsequent packets are encapsulated with the target DIP as destination before being forwarded to the corresponding server. Hash collision redirects packets that may not be registered in the flow table to a stateless ECMP bucket table (e.g., to reduce hash collision probability, each bucket is configured with multiple entries). A "miss" may happen in two cases in the flow table: i) if there is no available slot for a new connection (when receiving, for example, a SYN packet); and if no entry with the same hash digest is registered for an established connection.

From stage 210, where load balancer 110 obtains the server processing speed data associated with plurality of servers 115, method 200 may advance to stage 220 where load balancer 110 may obtain a plurality of queue lengths ($\hat{l}_i$) respectively associated with plurality of servers 115. For example, the dynamic load states of plurality of servers 115 may be estimated by counting the number of on-going connections with the state machine shown in FIG. 3B. Empty entries have NULL state while occupied ones may be in either the SYN or CONN state. When the first SYN packet is received on load balancer 110 from client device 105, load balancer 110 selects a server i (e.g., from plurality of servers 115) and forwards the new flow to server i. The subscript j corresponds to the load balancer. Because the example of FIG. 1 illustrates one load balancer 110, j may be equal to 1. Connection states SYN may be registered in an entry if there exists any available one in the bucket. If the connection is well-established (e.g., after three-way handshakes), and the first data packet is received from client device 105, its state will be updated to CONN.

The counter is the locally-observed queue length on server i, from the perspective of load balancer 110 and may not be incremented until the first data packet is received so that the counter is not corrupted when facing SYN flooding attacks. On receiving Finish (FIN) or Reset (RST) packets, which terminate connections, or in case of connection timeout (which may be determined based the corresponding T0 of the connection (e.g., current timestamp−T0>=40 s)), the state may be reset to NULL, and the registered entry may be evicted. The counter may be decremented if one flow ends with a previous connection state as CONN.

Once load balancer 110 obtains the plurality of queue lengths respectively associated with plurality of servers 115 in stage 220, method 200 may continue to stage 230 where load balancer 110 may determine a Shortest Expected Delay (SED) score for each of plurality of servers 115 based on the server processing speed data and the plurality of queue lengths. For example, flow time (i.e., flow duration) characterizations may help estimate server processing speeds and infer residual processing capacities. Using the flow table of FIG. 3A, embodiments of the disclosure may collect observed flow duration by sampling, when receiving packets of an established connection, the time interval between the timestamp of receiving the packet and the corresponding T0 of the connection. Based on the sampled flow durations, server processing speeds may be computed with e.g., Kalman filters, to reduce measurement and observation noise.

Figure 4:
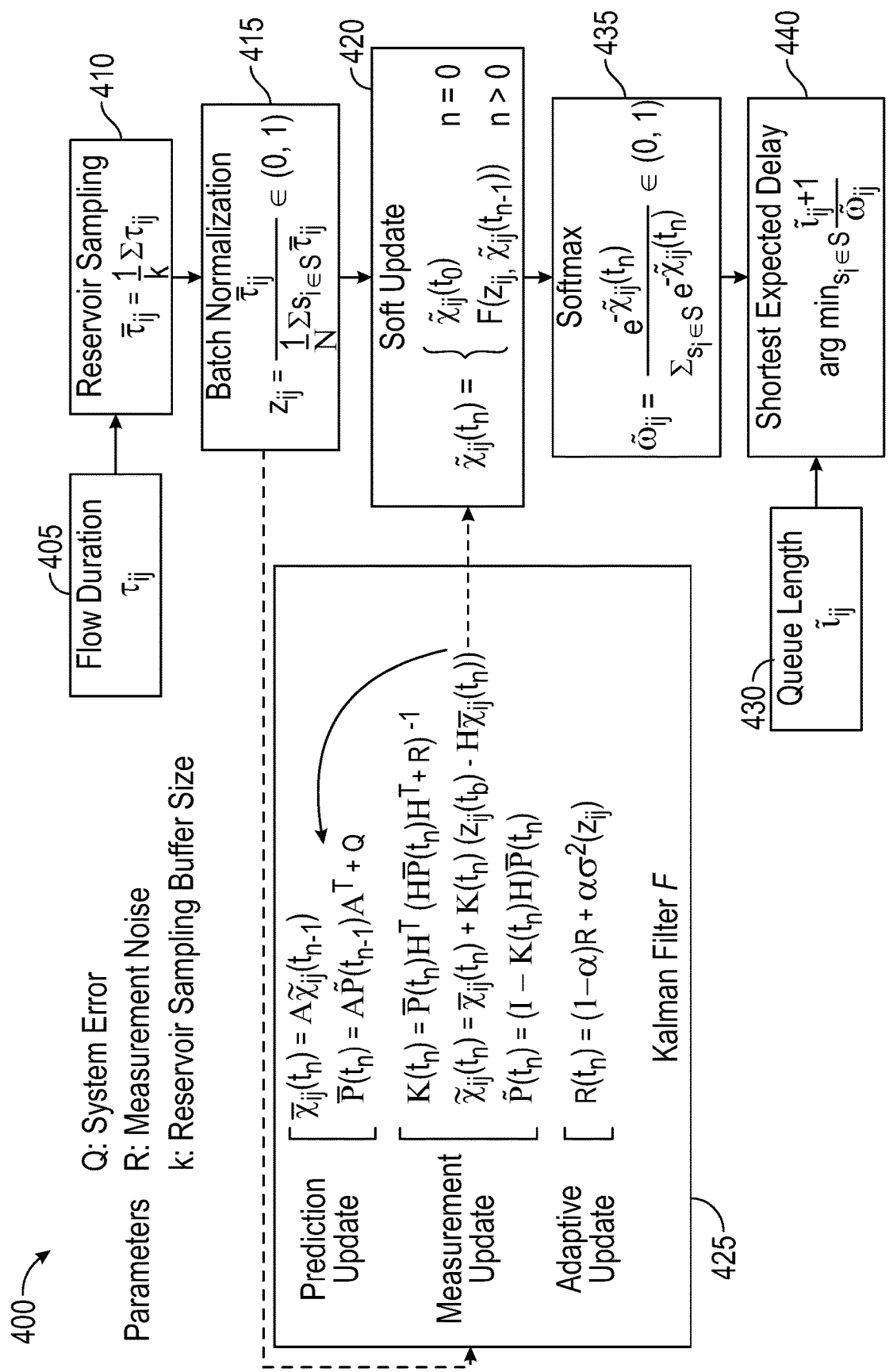
FIG. 4 illustrates a process for load balancing.

As shown in FIG. 4, with the observations of flow durations (stage 405) gathered in sampling buffers from the perspective of load balancer 110, the process of FIG. 4 may compute (stage 410) the average flow duration $T_{ij}$ on server i, and then may derive from that, $z_{ij}$, with the expression at Batch Normalization (stage 415). The normalized load state estimator $z_{ij}$ may be variant because of the input flows with variant lengths, which may not accurately reflect the residual processing capacity on servers and may potentially lead to a high rate of load balancer decisions changes. To smooth the estimation, and reduce this changing rate, embodiments of the disclosure may use the Soft Update procedure (stage 420), where F is the Kalman filter (stage 425). The results of the Soft Update may be transformed into normalized server processing speed (stage 435), for example, using Softmax.

As illustrated by FIG. 4, Kalman filters may have two parameters, Q and R, with high interpretability that may be tuned. System error Q may comprise a parameter to tune the confidence on the stationarity of server processing speed. In most cases, the server capacities in a data center may stay the same. Accordingly, there may be no system shift and Q may be configured as 0. Similar to Q, measurement variance R may comprise a parameter to be configured based on the expected noise in measurement. The value of R may be increased if the flow durations of input traffic vary a lot.

An adaptive approach to set R may be to use the variance of the measurements z. The below equation (see stage 425) may be softly updated.

$$R(t_n) = (1-\alpha)R + \alpha\sigma^2(z_{ij})$$

The parameter $\alpha$ may be chosen, for example, as 0.99 so that the half-life period for the original sensor noise R may be 60 update steps. A lower $\alpha$ may make R more responsive to the system dynamics but may also make it more sensitive to measurement noise. Consistent with embodiments of the disclosure, combining the recommended value of Q and the adaptive approach for R, no manual tweaking may be required.

After obtaining both measurements (queue lengths at stage 430 and the inferred processing speed of stage 435), a score may be derived from the two factors using, for example, the SED scheduling algorithm (stage 440). The queue lengths input (i.e., number of connections on a given server) for each of plurality of servers 115 may be updated as new flows are added to or dropped from the individual servers of plurality of servers 115. Stages 405 through 435 may be performed periodically. Accordingly, the inferred processing speed of stage 435 may be updated periodically. For example, the inferred processing speed of stage 435 may be updated every 200 ms.

After load balancer 110 determines the SED score for each of plurality of servers 115 based on the server processing speed data and the plurality of queue lengths in stage 230, method 200 may proceed to stage 240 where load balancer 110 may assign a flow to a one of plurality of servers 115 having the lowest SED score. For example, load balancer 110 may determine that second server 125 has the lowest SED score. Accordingly, load balancer 110 may assign a flow to second server 125. Once load balancer 110 assigns the flow to the one of plurality of servers 115 having the lowest SED score in stage 240, method 200 may then end at stage 250.

Accordingly, embodiments of the disclosure may make use of network features (e.g., average flow duration and number of on-going flows) that may be passively extracted from the data plane and infer instant server load state on the fly with the mathematical model described above. This inferred server load state may help make improved load balancing decisions. Workloads may be more fairly distribute across the servers. Optimized resource utilization may therefore reduce the cost of provisioning computational resources (e.g., application servers) and may improve quality of service.

Furthermore, embodiments of the disclosure may rely on in-network features, therefore no additional control plane (e.g., management channel among load balancers and application servers) may be configured to obtain actual server load state. In addition, no manual configuration may be required with embodiments of the disclosure to be adaptive to the given networking environment and converge to the steady state.

Figure 5:
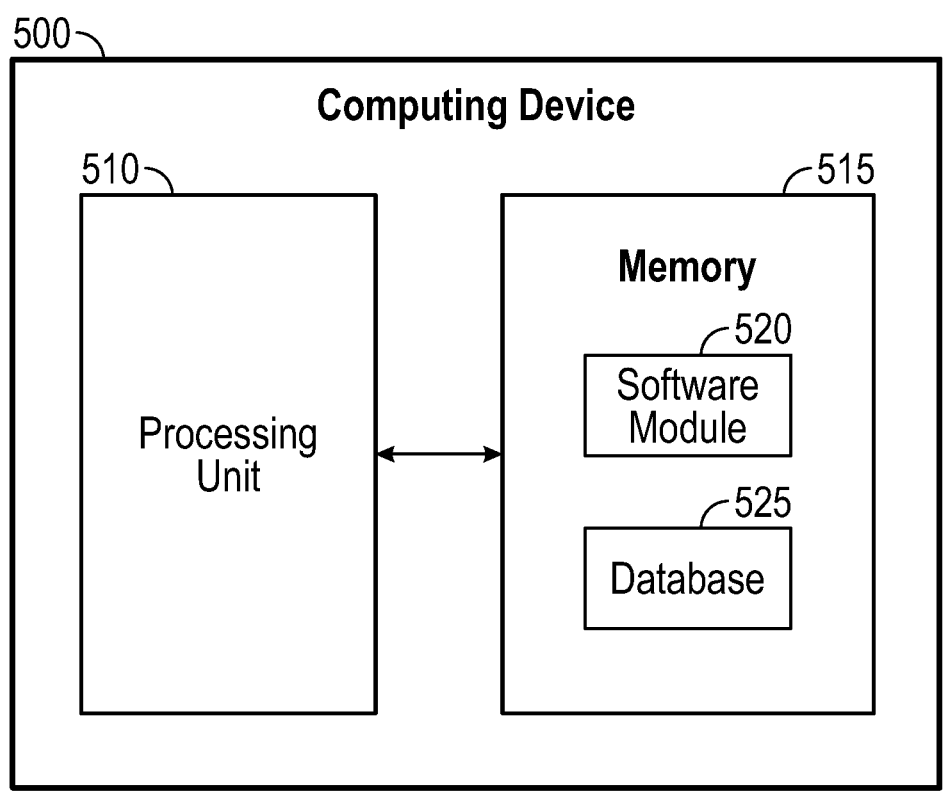
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing load aware load balancing as described above with respect to FIG. 2. Computing device 500, for example, may provide an operating environment for client device 105, load balancer 110, first server 120, second server 125, and third server 130. client device 105, load balancer 110, first server 120, second server 125, and third server 130 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   inferring, by a computing device, server processing speed data associated with a plurality of servers from flow duration data associated with a plurality of flows associated with the plurality of servers, wherein inferring the server processing speed data comprises using a Softmax normalization function on the flow duration data associated with the plurality of flows associated with the plurality of servers;
   obtaining a plurality of queue lengths respectively associated with the plurality of servers;
   determining a Shortest Expected Delay (SED) score for each of the plurality of servers from the inferred server processing speed data and the plurality of queue lengths; and
   assigning a flow to the one of the plurality of servers having a lowest SED score.

2. The method of claim 1, further comprising obtaining the flow duration data wherein obtaining the flow duration data comprises determining an average flow duration for each of the plurality of servers.

3. The method of claim 2, wherein obtaining the flow duration data comprises deriving a normalization of the average flow duration for each of the plurality of servers.

4. The method of claim 3, wherein obtaining the flow duration data comprises using a Kalman Filter on the normalization of the average flow duration for each of the plurality of servers.

5. The method of claim 1, further comprising:
   incrementing a one of the plurality of queue lengths when its corresponding server of the plurality of servers is assigned a new flow; and
   decrementing the one of the plurality of queue lengths when a flow ends on its corresponding server of the plurality of servers.

6. The method of claim 1, further comprising refreshing the server processing speed data periodically.

7. The method of claim 6, wherein refreshing the server processing speed data periodically comprises refreshing the server processing speed data every 200 ms.

8. A system comprising:
   a memory storage; and
   a processing unit coupled to the memory storage, wherein the processing unit is operative to:
   infer server processing speed data associated with a plurality of servers from flow duration data associated with a plurality of flows associated with the plurality of servers, wherein the processing unit being operative to infer the server processing speed data comprises the processing unit being operative to use a Softmax normalization function on the flow duration data associated with the plurality of flows associated with the plurality of servers;

obtain a plurality of queue lengths respectively associated with the plurality of servers;

determine a Shortest Expected Delay (SED) score for each of the plurality of servers from the inferred server processing speed data and the plurality of queue lengths; and assign a flow to the one of the plurality of servers having a lowest SED score.

9. The system of claim 8, wherein the processing unit is further operative to obtain the flow duration data wherein the processing unit being operative to obtain the flow duration data comprises the processing unit being operative to determine an average flow duration for each of the plurality of servers.

10. The system of claim 9, wherein the processing unit being operative to obtain the flow duration data comprises the processing unit being operative to derive a normalization of the average flow duration for each of the plurality of servers.

11. The system of claim 10, wherein the processing unit being operative to obtain the flow duration data comprises the processing unit being operative to use a Kalman Filter on the normalization of the average flow duration for each of the plurality of servers.

12. The system of claim 8, comprising the processing unit being further operative to:

increment a one of the plurality of queue lengths when its corresponding server of the plurality of servers is assigned a new flow; and decrement the one of the plurality of queue lengths when a flow ends on its corresponding server of the plurality of servers.

13. A non-transitory computer-readable medium that stores a set of instructions which when executed by a processor perform a method executed by the set of instructions comprising:

inferring, by a computing device, server processing speed data associated with a plurality of servers from flow duration data associated with a plurality of flows associated with the plurality of servers, wherein inferring the server processing speed data comprises using a Softmax normalization function on the flow duration data associated with the plurality of flows associated with the plurality of servers;

obtaining a plurality of queue lengths respectively associated with the plurality of servers;

determining a Shortest Expected Delay (SED) score for each of the plurality of servers from the inferred server processing speed data and the plurality of queue lengths; and assigning a flow to the one of the plurality of servers having a lowest SED score.

14. The non-transitory computer-readable medium of claim 13, further comprising obtaining the flow duration data wherein obtaining the flow data comprises determining an average flow duration for each of the plurality of servers.

15. The non-transitory computer-readable medium of claim 14, wherein obtaining the flow duration data comprises deriving a normalization of the average flow duration for each of the plurality of servers.

16. The non-transitory computer-readable medium of claim 15, wherein obtaining the flow duration data comprises using a Kalman Filter on the normalization of the average flow duration for each of the plurality of servers.

17. The non-transitory computer-readable medium of claim 13, further comprising: incrementing a one of the plurality of queue lengths when its corresponding server of the plurality of servers is assigned a new flow; and decrementing the one of the plurality of queue lengths when a flow ends on its corresponding server of the plurality of servers.

18. The non-transitory computer-readable medium of claim 13, further comprising refreshing the server processing speed data periodically.

19. The non-transitory computer-readable medium of claim 18, wherein refreshing the server processing speed data periodically comprises refreshing the server processing speed data every 200 ms.

20. The system of claim 8, further comprising refreshing the server processing speed data periodically.

\* \* \* \* \*